United States Patent [19]
Mori

[11] Patent Number: 5,513,874
[45] Date of Patent: May 7, 1996

[54] VEHICLE SUSPENSION SYSTEM

[75] Inventor: Hiroshi Mori, Maebashi, Japan

[73] Assignee: Fuji Jukogyo Kabushiki Kaisha, Tokyo, Japan

[21] Appl. No.: 401,629

[22] Filed: Mar. 9, 1995

[30] Foreign Application Priority Data

Mar. 28, 1994 [JP] Japan .................................. 6-057508
Oct. 6, 1994 [JP] Japan .................................. 6-242764

[51] Int. Cl.$^6$ .................................................. B60G 3/70
[52] U.S. Cl. ........................... 280/666; 280/670; 280/675; 280/696
[58] Field of Search .......................... 280/93, 96.1, 663, 280/666, 667, 670, 675, 690, 691, 696, 701

[56] References Cited

U.S. PATENT DOCUMENTS

| | | | |
|---|---|---|---|
| 5,048,860 | 9/1991 | Kanai et al. | 280/691 |
| 5,102,159 | 4/1992 | Sato et al. | 280/663 |
| 5,176,398 | 1/1993 | Kanai et al. | 280/670 |
| 5,193,843 | 3/1993 | Yamamoto et al. | 280/675 |
| 5,238,261 | 8/1993 | Ogiso | 280/667 |

FOREIGN PATENT DOCUMENTS 2249712  10/1990  Japan .

*Primary Examiner*—Kenneth R. Rice
*Attorney, Agent, or Firm*—Martin A. Farber

[57]  ABSTRACT

A double wishbone type suspension system characterized in a front lateral link provided under a trailing link and a shock absorber provided at the front lateral link so as to lower the position of the shock absorber, further characterized in arranging the connecting point of the front lateral link with an axle housing located longitudinally nearby a wheel axle and the connecting point of a rear lateral link with the axle housing located longitudinally far from the wheel axle, whereby a protrusion of the shock absorber into the passenger compartment or the engine room being prevented and additionally an improvement of the vehicle maneuvarability and stability being obtained.

21 Claims, 4 Drawing Sheets

VEHICLE SUSPENSION SYSTEM

BACKGROUND OF THE INVENTION

1. Technical Field

The present invention relates to a vehicular suspension system, and more particularly, to a double wishbone type suspension system for driving wheels of a vehicle.

2. Related Prior Arts

An exemplary double wishbone type suspension system for driving wheels is disclosed in Japanese Patent Application Laid Open No. Toku-Kai-Hei 2-249712 as illustrated schematically in FIG. 5 and FIG. 6. The suspension system comprises a wheel 31 driven by a drive shaft 38, an axle housing 32 supporting the wheel 31, an upper arm 33 extending transversely in the vehicle from its inner ends pivotably connected with a body of the vehicle to its outer end pivotably connected with the axle housing 32, lateral links 34 (front) and 35 (rear) extending transversely in the vehicle from their inner ends pivotably connected with the body of the vehicle respectively to their outer ends pivotably connected with lower portions of the axle housing 32 respectively, a trailing link 36 with its one end pivotably connected to a lower portion of the axle housing 32 and with its another end pivotably connected to the body of the vehicle, a shock absorber 37 with its upper end mounted by a body flame of the vehicle and with its lower end pivotably connected to the rear lateral link 35, thus the assembly of the axle housing 32 and the wheel 31 being swingable up and down relative to the vehicle body when the wheel 31 bounds or rebounds.

In the abovementioned suspension system, since the trailing link 36 is needed to be arranged so as to connect its one end with the axle housing at a portion thereof adjacent to the drive axle 38, it is inevitable that the front lateral link 34 and the trailing link 36 cross each other in the plane view and consequently both these links must be arranged with a substantially large space therebetween in order to avoid interference with each other. Because of this, the front lateral link 34 is needed to be disposed at a relatively high position and consequently there is no room in the vertical direction for accommodating the shock absorber between the front lateral link 34 and the body flame. Thus, in this prior art the shock absorber 37 is mounted on the rear lateral link 35. Generally in this case, the rear lateral link 35 is connected with the axle housing 32 at a portion adjacent to the drive axle 38, that is to say, the distance between the supporting point of the rear lateral link 35 and the drive axle 38 is determined to be as small as possible, in order to decrease a moment around the axle 38 of the reaction force applied from the shock absorber 37.

However, mounting the shock absorber on the rear lateral link as disclosed in this prior art provides a disadvantage in a turn running performance of the vehicle. Namely, when the vehicle turns a corner, the toe angle of the wheel 31 tends to change in a toe-out direction by the large component of the cornering force applied to the rear lateral link 35 because of the relatively small distance between the drive axle 38 and the connecting point of the rear lateral link 35 with the axle housing 32.

Further, in the prior art there are difficulties in securing a camber angle and a tread rigidity because of the front lateral link arranged at a relatively high position.

SUMMARY OF THE INVENTION

In view of the abovementioned circumstances associated with the double wishbone type suspension system, it is a primary object of the present invention to provide a vehicle suspension system in which the shock absorber can be accommodated at a low position ensuring a desirable wheel stroke and consequently a protruded portion of the shock absorber into the passenger compartment can be eliminated.

Further, it is a further object of the present invention to provide a vehicle suspension system in which rigidities of the wheel alignments such as toe-in, camber, tread and the like can be secured, whereby the maneuverability and stability of the vehicle can be improved substantially.

According to the present invention, the abovementioned objects are accomplished by a vehicular suspension system, comprising: an axle housing for supporting a vehicle wheel to be rotatable about a center of a wheel axle, an upper arm for supporting said axle housing from upward, a trailing link for supporting the axle housing from forward, a front lateral link provided under the trailing link for supporting said axle housing from downward and forward, a rear lateral link for supporting said axle housing from downward and backward, a shock absorber provided on the front lateral link for absorbing a shock from said vehicle wheel and supporting a weight of said vehicle, and further comprising the front lateral link connected with the axle housing at a longitudinally short distance from the center of the wheel axle and the rear lateral link connected with the axle housing at a longitudinally long distance from the center of the wheel axle.

One advantage of the present invention is that since the front lateral link is arranged under the trailing link, the connecting point of the shock absorber provided on the front lateral link can be lowered. Consequently, the projection of the shock absorber into the passenger compartment or the engine room can be avoided.

A further advantage of the present invention is that since the connecting point of the front lateral link with the axle housing is located at a longitudinally shorter distance from the center of the wheel axle than the connecting point of the rear lateral link with the axle housing, the vehicle maneuverability is improved.

DETAILED DESCRIPTION OF PREFERRED EMBODIMENTS

Figure 1:
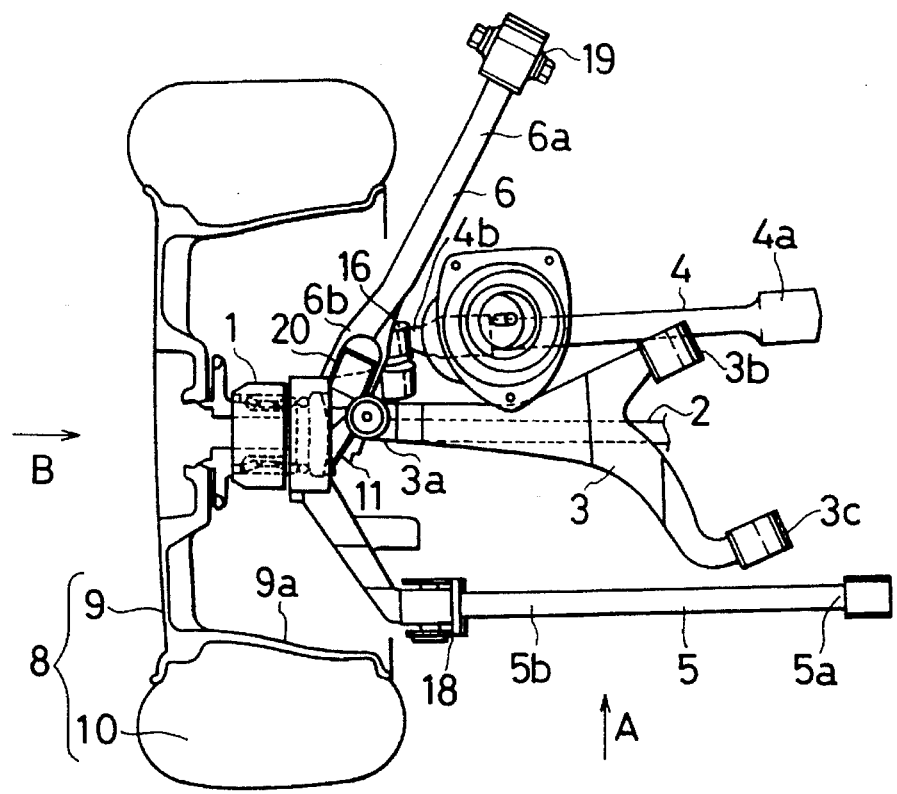
FIG. 1 is a top view showing an embodiment of the suspension system according to the present invention.
Figure 2:
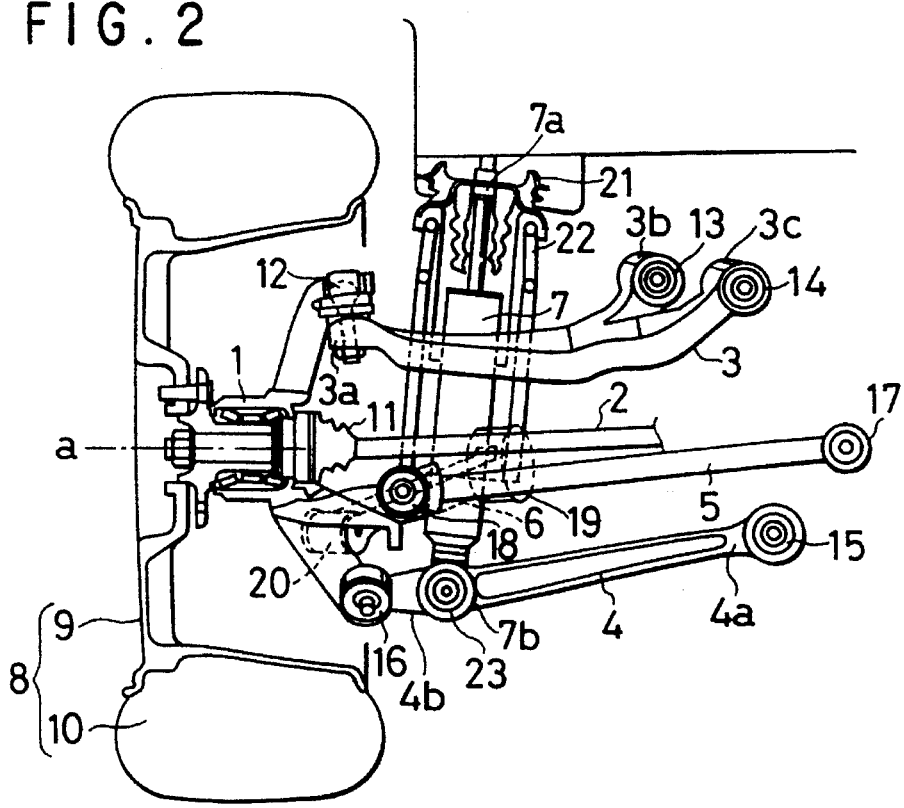
FIG. 2 is a rear view (viewing from A direction in FIG. 1) showing the embodiment of the suspension system illustrated in FIG. 1.
Figure 3:
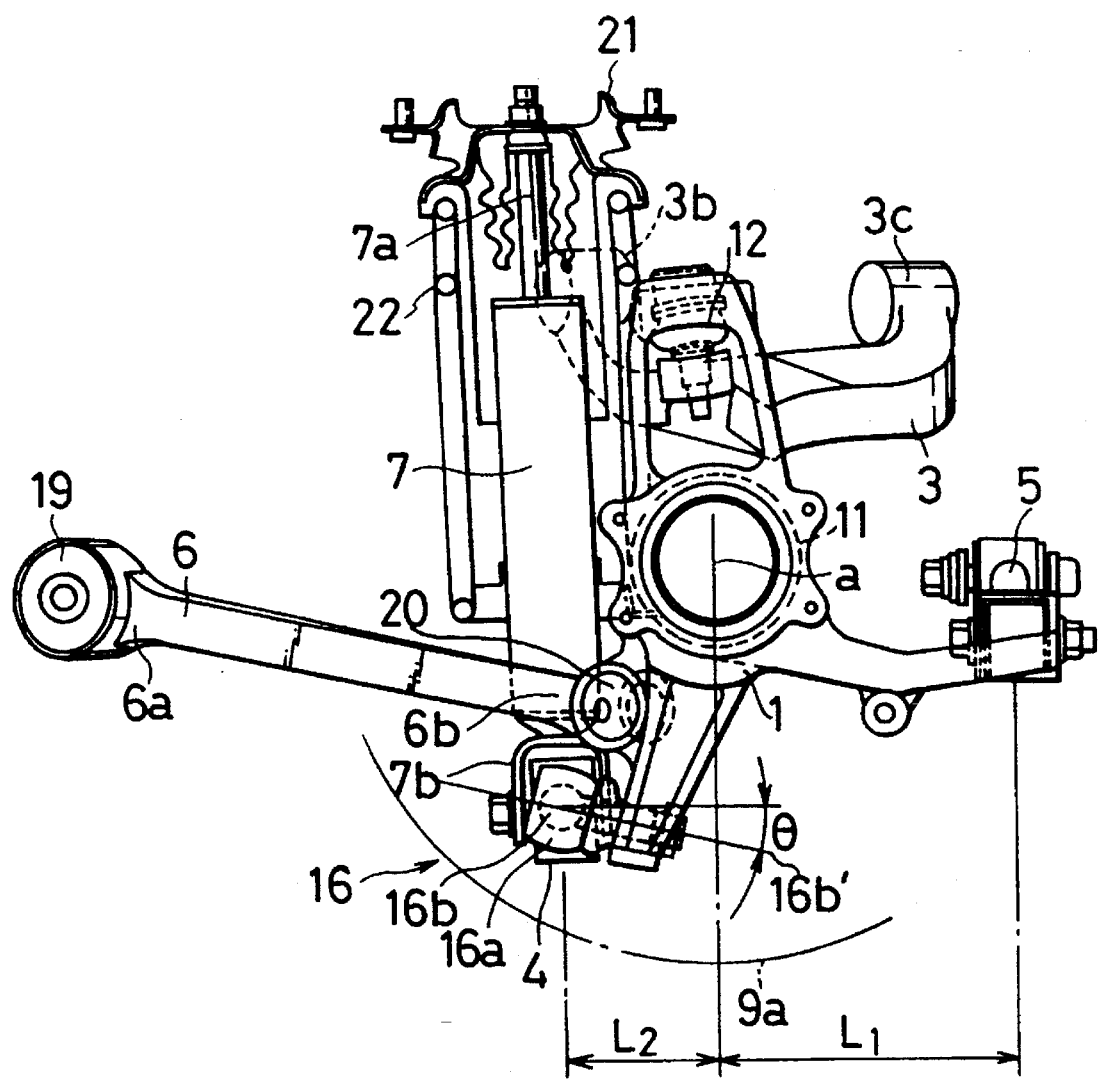
FIG. 3 is a side view (viewing from B direction in FIG. 1) showing the embodiment of the suspension system illustrated in FIG. 1.

FIGS. 1, 2, and 3 are a top view, a rear view and a side view, respectively, showing an embodiment of the suspension system according to the present invention. The primary components constituting the suspension system are an axle housing 1, a drive shaft 2, an upper arm 3, a front lateral link 4, a rear lateral link 5, a trailing link 6 and a shock absorber 7.

The axle housing 1 supports a vehicle wheel 8 comprising a wheel 9 and a tire 10. The vehicle wheel 8 is rotated by the drive shaft 2 through a constant velocity joint (not shown). Numeral 11 denotes a rubber boot to cover the constant velocity joint for protection.

The upper arm 3 has a "A" or "V" shaped flame whose outer end 3a is pivotably connected with a portion higher than a center axis a of the vehicle wheel 8 of the axle housing 1 through a ball-and-socket joint 12 and whose inner ends 3b and 3c are pivotably connected with a sub-flame (not shown) disposed under the vehicle body through rubber bushings 13 and 14 having a rubber provided between outer cylinders and inner ones.

The front lateral link 4 is a straight and "I" shaped arm whose inner end 4a is pivotably connected with the aforementioned sub-flame through a rubber bushing 15 and whose outer end 4b is pivotably connected with an end portion located more downward and more forward than the drive shaft 2 of the arm of the axle housing 1 through a coupling element such as a ball-and-socket joint 16.

As shown in FIG. 3, the ball-and-socket joint 16 comprises a socket 16a provided at the outer end 4b of the front lateral link 4, a ball-with stud 16b fastened on the end portion of the arm of the axle housing 1. The center line of the ball-with stud 16b slants at an angle θ to the level line in the rotational direction of the vehicle wheel 8.

The rear lateral link 5 is a straight shaped arm whose inner end 5a is pivotably connected with the sub-flame of the vehicle body through a rubber bushing 17 and whose outer end 5b is pivotably connected with an end portion located more downward and more backward than the drive shaft 2 of the arm of the axle housing 1 through a rubber bushing 18.

Here referring to FIG. 3, designating a distance in the level direction between the perpendicular line from the center of the drive shaft 2 and the perpendicular line from the center of the rubber bushing 18 to be $L_1$ and a distance in the level direction between the perpendicular line from the center of the drive shaft 2 and the perpendicular line from the center of the ball-and-socket joint 16 to be $L_2$, the distance $L_1$ is determined to be larger than the distance $L_2$ in the embodiment according to the present invention.

The trailing link 6 is a straight shaped arm whose front end 6a is pivotably connected with the sub-flame of the vehicle body through a rubber bushing 19 and whose rear end 6b is connected with the axle housing 1 through a rubber bushing 20 at a portion located between the ball-and-socket joint 16 and the boot 11 of the constant velocity joint and also more outward than the ball-and-socket joint 12.

Further, the shock absorber 7 is connected with the vehicle body at its upper end 7a through a mount 21 and enclosed by a coil spring 22 which is integrally assembled therewith. A lower end 7b of the shock absorber 7 is pivotably connected with an intermediate portion of the front lateral link 4 through a rubber bushing 23. These rubber bushings 15, 17, 18, 19, 20 and 23 are constituted with outer cylinders, inner cylinders and rubbers inserted therebetween in the same manner as aforementioned rubber bushings 13 and 14.

Next, the effect of the suspension system thus constituted will be explained.

According to the embodiment of the present invention, since the front lateral link 4 is arranged under the trailing link 6 and the shock absorber 7 is mounted thereon, the position of the shock absorber 7 can be lowered, whereby a protrusion of the shock absorber into the passenger compartment can be eliminated. Furthermore, since the shock absorber 7 is connected with the front lateral link 4 and additionally the connecting point of the front lateral link 4 with the axle housing 1 is located relatively adjacent to the perpendicular line of the drive shaft 2 and the connecting point of the rear lateral link 5 is located relatively far from the perpendicular line of the drive shaft 2, the wheel tends to toe-in when the vehicle makes a turn differently from the case of the prior art where the shock absorber is mounted on the rear lateral link and consequently the vehicle maneuverability and stability can be improved.

Further, since the connecting point of the front lateral link 4 with the axle housing 1 is located at a substantially low position, this provides a good effect on the maintenance of the camber or the tread of the wheel.

Further, according to the embodiment of the present invention, since the connecting point of the trailing link 6 with the axle housing 1 is located more outward than the connecting point of the upper arm 3 with the axle housing 1, the arrangement of toe-in can be achieved more easily when braking is applied to the vehicle.

Further, as an advantage in designing, since the front lateral link 4 is shifted well lower than the drive shaft 2, a space for the bushing 20 of the trailing arm 6 can be formed between the connecting point of the front lateral link 4 and the drive shaft 2 and therefore no additional arm for providing the bushing 20 is needed.

Further, the reaction force applied to the wheel while the vehicle runs is transmitted to both the front and rear lateral links. In this case, since the connecting point of the front lateral link 4 with the axle housing 1 is located relatively adjacent to the perpendicular line of the drive shaft 2 and the connecting point of the rear lateral link 5 is located relatively far from the perpendicular line of the drive shaft 2, the component of the reaction force applied from the wheel is large on the front lateral link side and small on the rear lateral link side. Consequently, when the suspension system according to the present invention is applied to a four wheel steering vehicle, a steering gear box (not shown) can be equipped on the rear lateral link 5 where the influence of the reaction force applied from the wheel is relatively small. This is advantageous to the steering performance and also to the durability of the steering gear box.

Figure 4:
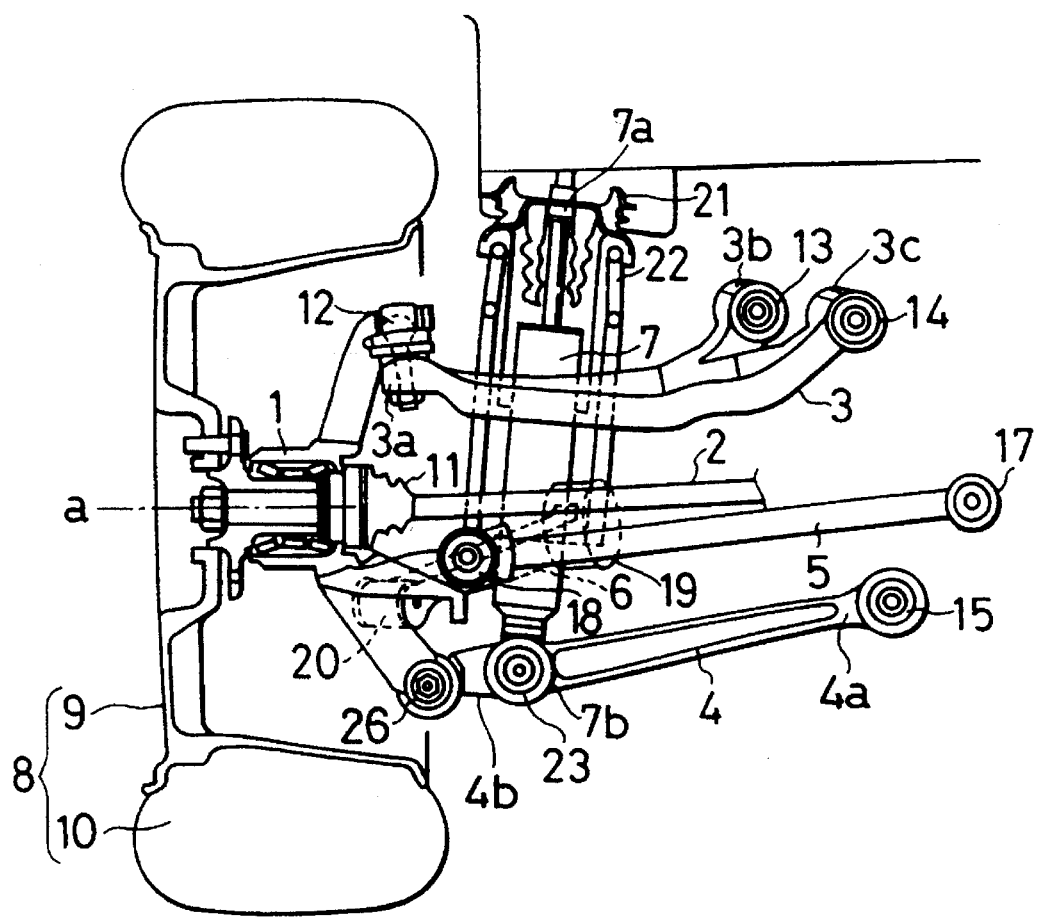
FIG. 4 is a view showing another embodiment of the suspension system according to the present invention.
Figure 5:
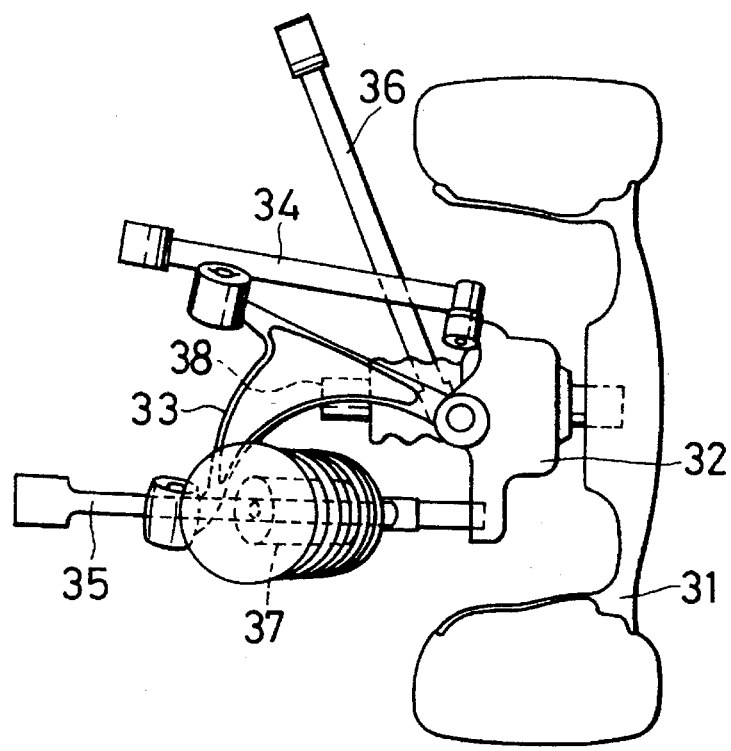
FIG. 5 is a top view showing a suspension system according to the prior art.
Figure 6:
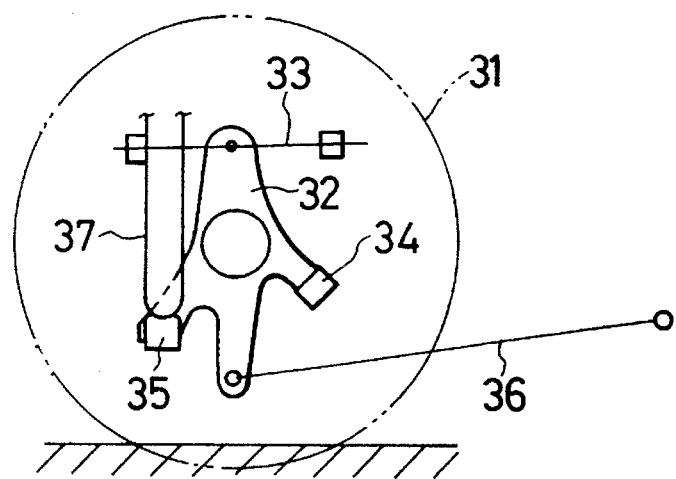
FIG. 6 is a side view showing the suspension system illustrated in FIG. 5.

In the embodiment above described, the ball-and-socket joint 16 is employed for connecting pivotably the outer end of the front lateral link 4 with the axle housing 1, however as another embodiment of the present invention, a rubber bushing 26 may be employed in place of the ball-and-socket joint 16 as shown in FIG. 4 to the advantage of the manufacturing cost.

Further, in the aforementioned embodiment, the suspension system of the vehicle wheel having a drive shaft has been described. However, the suspension system according to the present invention can be applied to the vehicle wheel having a driven (not driving) shaft without modifying the fundamental constitution of the suspension system.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A suspension system for a wheel supporting a vehicle, having a vehicle body operatively connected to said suspension system, an axle housing rotatably connected to said wheel, an upper arm pivotably connected to said axle housing upwardly, a front lateral link pivotably connected to said axle housing downwardly and forwardly, a rear lateral link pivotably connected to said axle housing downwardly and backwardly, a trailing link pivotably connected to said axle housing forwardly, and a shock absorber, comprising:

an upper housing arm extended from said axle housing upwardly;

a lower housing arm extended from said axle housing downwardly;

a rear housing arm extended from said axle housing backwardly;

an inner joint provided on said vehicle body for pivotably connecting said upper arm with said vehicle body;

an outer joint provided at an end of said upper housing arm for pivotably connecting said upper arm with said upper housing arm;

an inner front joint provided on said vehicle body for pivotably connecting said front lateral link with said vehicle body;

an outer front joint provided at an end of said lower housing arm such that a center of said outer front joint is offset forward of said center of said wheel at a longitudinally small distance for pivotably connecting said front lateral link with said lower housing arm;

an inner rear joint provided on said vehicle body for pivotably connecting said rear lateral link with said vehicle body;

an outer rear joint provided at an end of said rear housing arm such that a center of said outer rear joint is offset backward of said center of said wheel at a longitudinally larger distance than said small distance in said outer front joint for pivotably connecting said rear lateral link with said rear housing arm;

a front joint provided on said vehicle body for pivotably connecting said trailing link with said vehicle body;

a rear joint provided at a higher portion of said lower housing arm than a center of said outer front joint such that a center of said rear joint is located more outwardly than a center of said outer joint for pivotably connecting said trailing link with said lower housing arm; and a link joint provided on said front lateral link for pivotably connecting said shock absorber with said front lateral link.

2. The suspension system according to claim 1, wherein said front lateral link is provided under said trailing link with a substantial gap therebetween so as to avoid interference with each other.

3. The suspension system according to claim 1, wherein said inner joint is a rubber bushing.

4. The suspension system according to claim 1, wherein said outer joint is a rubber bushing.

5. The suspension system according to claim 1, wherein said inner front joint is a rubber bushing.

6. The suspension system according to claim 1, wherein said outer front joint is a rubber bushing.

7. The suspension system according to claim 1, wherein said inner rear joint is a rubber bushing.

8. The suspension system according to claim 1, wherein said outer rear joint is a rubber bushing.

9. The suspension system according to claim 1, wherein said link joint is a rubber bushing.

10. The suspension system according to claim 1, wherein said front joint is a rubber bushing.

11. The suspension system according to claim 1, wherein said rear joint is a rubber bushing.

12. The suspension system according to claim 1, wherein said inner joint is a ball-and-socket joint.

13. The suspension system according to claim 1, wherein said outer joint is a ball-and-socket joint.

14. The suspension system according to claim 1, wherein said inner front joint is a ball-and-socket joint.

15. The suspension system according to claim 1, wherein said outer front joint is a ball-and-socket joint.

16. The suspension system according to claim 1, wherein said inner rear joint is a ball-and-socket joint.

17. The suspension system according to claim 1, wherein said outer rear joint is a ball-and-socket joint.

18. The suspension system according to claim 1, wherein said link joint is a ball-and-socket joint.

19. The suspension system according to claim 1, wherein said front joint is a ball-and-socket joint.

20. The suspension system according to claim 1, wherein said rear joint is a ball-and-socket joint.

21. The suspension system according to claim 1, wherein said rear lateral link is driven by a steering device so as to steer said vehicle wheel.

* * * * *